US009384367B2

(12) United States Patent
Swanson et al.

(10) Patent No.: US 9,384,367 B2
(45) Date of Patent: Jul. 5, 2016

(54) MEASURING PLATFORM COMPONENTS WITH A SINGLE TRUSTED PLATFORM MODULE

(75) Inventors: Robert C. Swanson, Olympia, WA (US); Palsamy Sakthikumar, Puyallup, WA (US); Mallik Bulusu, Olympia, WA (US); Robert Bruce Bahnsen, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 312 days.

(21) Appl. No.: 13/602,449

(22) Filed: Sep. 4, 2012

(65) Prior Publication Data

US 2014/0068275 A1 Mar. 6, 2014

(51) Int. Cl.
*G06F 21/57* (2013.01)
*G06F 21/72* (2013.01)
*G06F 21/76* (2013.01)

(52) U.S. Cl.
CPC .............. *G06F 21/72* (2013.01); *G06F 21/57* (2013.01); *G06F 21/575* (2013.01)

(58) Field of Classification Search
CPC .................................................. G06F 21/572
See application file for complete search history.

(56) References Cited

U.S. PATENT DOCUMENTS

| 7,200,758 | B2 * | 4/2007 | Zimmer | 713/192 |
| 7,707,411 | B2 | 4/2010 | Bade | |
| 7,752,428 | B2 * | 7/2010 | Datta et al. | 713/2 |
| 8,245,053 | B2 * | 8/2012 | Hoang et al. | 713/189 |
| 2004/0098521 | A1 * | 5/2004 | Lin | 710/72 |
| 2008/0060068 | A1 * | 3/2008 | Mabayoje | G06F 21/31 726/9 |
| 2009/0327678 | A1 * | 12/2009 | Dutton | G06F 21/32 713/2 |
| 2010/0235648 | A1 * | 9/2010 | Hoang | G06F 21/575 713/189 |
| 2011/0276845 | A1 * | 11/2011 | Depew et al. | 714/718 |
| 2011/0302425 | A1 * | 12/2011 | Saripalli | H04L 41/044 713/189 |

FOREIGN PATENT DOCUMENTS

| JP | 2006501581 | 1/2006 |
| JP | 2007026442 | 2/2007 |
| JP | 2011150439 | 8/2011 |

OTHER PUBLICATIONS

PCT International Search Report and Written Opinion issued in corresponding PCT/US2013/057249 dated Dec. 30, 2013, (12 pages).

Enhanced Serial Peripheral Interface (eSPI), Jun. 2013, Revision 0.75, 20 pages.

* cited by examiner

*Primary Examiner* — Venkat Perungavoor
(74) *Attorney, Agent, or Firm* — Trop Pruner & Hu, P.C.

(57) ABSTRACT

In accordance with some embodiments, a single trusted platform module per platform may be used to handle conventional trusted platform tasks as well as those that would arise prior to the existence of a primary trusted platform module in conventional systems. Thus one single trusted platform module may handle measurements of all aspects of the platform including the baseboard management controller. In some embodiments, a management engine image is validated using a read only memory embedded in a chipset such as a platform controller hub, as the root of trust. Before the baseboard management controller (BMC) is allowed to boot, it must validate the integrity of its flash memory. But the BMC image may be stored in a memory coupled to a platform controller hub (PCH) in a way that it can be validated by the PCH.

25 Claims, 2 Drawing Sheets

MEASURING PLATFORM COMPONENTS WITH A SINGLE TRUSTED PLATFORM MODULE

BACKGROUND

This relates generally to trusted platform modules.

A trusted platform module enables secure generation of cryptographic keys and limitations on their use. It may include capabilities such as remote attestation and sealed storage. Remote attestation creates a nearly unforgeable hash key summary of hardware and/or software configurations.

The primary function of a trusted platform module is to ensure the "integrity" of the platform, where integrity refers to ensuring that the platform will behave as intended. A platform is any computer platform including a server or personal computer, cellular telephone or any other processor based device.

The trusted platform module (TPM) may include platform configuration registers (PCRs) that allow secure storage or reporting of security relevant metrics. These metrics may be used to detect changes to prior configurations and to decide how to proceed.

For some users, any firmware used on a platform must be verified. To verify the firmware it must be measured relative to a root of trust, such as a trusted platform module. A platform may include a baseboard management controller (BMC) that executes prior to a host based trusted platform module's existence on the platform.

Many manufacturers place two trusted platform modules (including a primary and secondary module) on the platform. One module is used for the host domain, including the Basic Input/Output System (BIOS) and operating system. The other module is for manageability software. The module for the host domain is unable to measure firmware running on the baseboard management controller. This adds to platform cost and complexity.

BRIEF DESCRIPTION OF THE DRAWINGS

Some embodiments are described with respect to the following figures.

DETAILED DESCRIPTION

In accordance with some embodiments, a single trusted platform module per platform may be used to handle conventional trusted platform tasks as well as those that would arise prior to the existence of a primary trusted platform module in conventional systems. Thus one single trusted platform module may handle measurements of all aspects of the platform including the baseboard management controller.

In some embodiments, a management engine image is validated using a read only memory embedded in a chipset such as a platform controller hub, as the root of trust. Before the baseboard management controller (BMC) is allowed to boot, it must validate the integrity of its flash memory. But the BMC image may be stored in a memory coupled to a platform controller hub (PCH) in a way that it can be validated by the PCH.

In some embodiments, an enhanced serial parallel interface (eSPI) provides a mechanism to tunnel low pin count (LPC) bus signals over an SPI bus and also supports upstream memory access to the platform controller hub's (PCH's) SPI controller. As a result, the cost of an extra trusted platform module may be eliminated in some embodiments.

To improve computer security, the Trusted Computing Group (TCG), an industry-standards organization was formed with the aim of enhancing the security of the computing environment in disparate computer platforms. The TCG has formed and adopted specifications for more secure computers. TCG specifications define trusted computer platforms, computer platforms which may behave in a particular manner for a specific purpose. A trusted platform may provide data security functions such as data encryption and decryption and data storage. A key component of a trusted platform is the trusted platform module (TPM), a module which may perform cryptographic hashings to detect loss of integrity, public and secret key encryption to prevent unauthorized disclosure of data, and digital signing to authenticate transmitted information. The TCG Protected Storage mechanisms, which may be rooted in hardware, may be used to protect keys, secrets and hash values.

A trusted platform may also demonstrate that it operates in a safe configuration when it has access to confidential data by providing measurements of the configuration. TCG specifications provide for measuring the components of a computer platform, both hardware and software, and for storing the results of the measurements. The measurements of a configuration may be hashed and stored in Platform Configuration Registers (PCRs). A trusted platform may allow access to data only under a particular configuration of the trusted platform. The TPM seal operation may encrypt data, a set of PCR values, and an authorization or unique identifier. To unseal the data, and thereby gain access to it, the authorization must be presented and the set of values stored in the PCRs must match the set used in the seal operation. Similarly, a signing key may be sealed to a set of PCR values.

Figure 1:
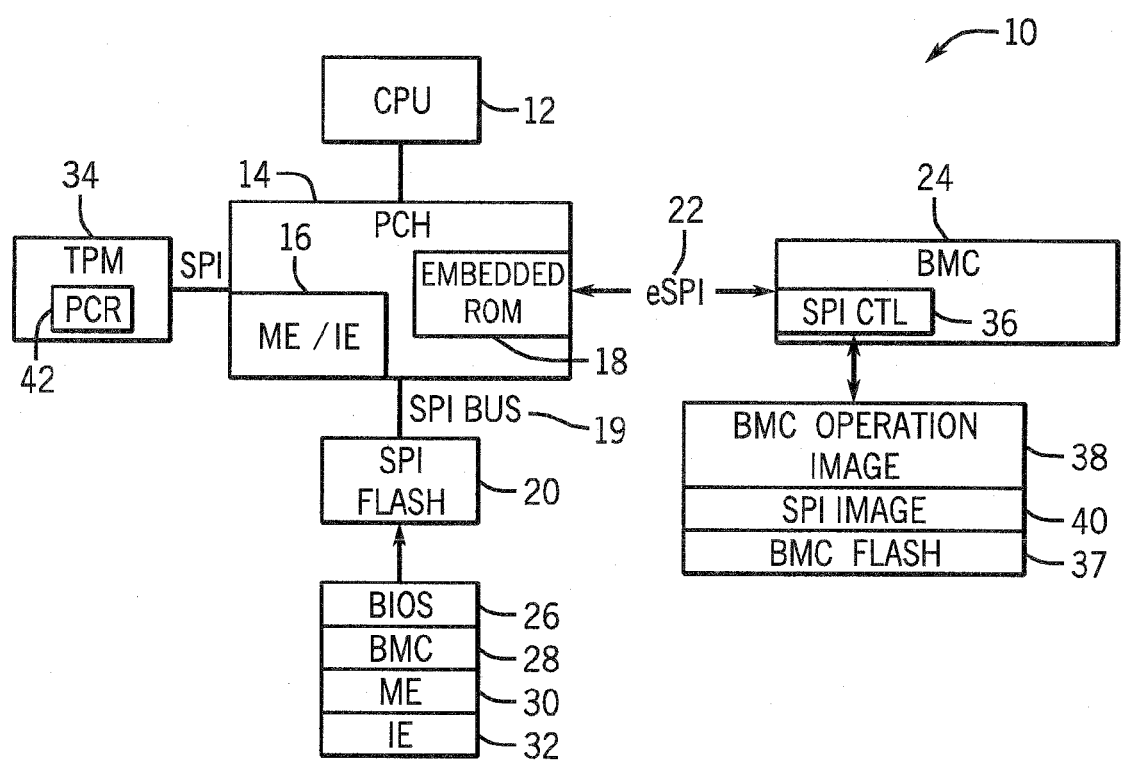
FIG. 1 is a firmware layout for a platform according to one embodiment.

Thus referring to FIG. 1, a platform 10 may include one or more central processing unit's (CPUs) 12 and a platform controller hub (PCH) 14. Other architectures are also contemplated which may use other chipsets in place of the PCH. The platform may include the BMC 24 as well. In some embodiments the BMC may be coupled to the PCH 14 over an SPI bus 22. In one embodiment the bus 22 may be an enhanced SPI bus or eSPI bus.

The PCH may include a management engine (ME) and innovation engine (IE) 16. A management engine is isolated and protected computer hardware operating below the operating system. An innovation engine enables the integration of the BMC into the chipset. Coupled to the PCH 14 may be flash memory 20 associated with the SPI bus 19. The flash memory 20 may store basic input/output system (BIOS) code 28, BMC code 30, management engine code 32 and innovation engine code 34. Because these codes are coupled to the PCH, they can be verified from the same root of trust, using the same trusted platform module.

BMC 24 may comprise a microcontroller which monitors on-board instrumentation (temperature sensors, CPU status, fan speed, voltages), provides remote reset or power-cycle capabilities, sends alarms when a failure occurs, and enables remote access to BIOS configuration or operating system console information. BMC 24 may serve as the interface between platform hardware and management software. BMC may be capable of operating separately from the CPU 12 and the operating system. BMC 24 may communicate with a chassis management monitor, reporting conditions and receiving commands.

The security system measures the management engine and logs its value in the PCR 42, either for a firmware TPM (e.g.

within the PCH) or a physical TPM 34. The read only memory (ROM) 18 embedded in the PCH can measure the management engine code. Thus the management engine measures the image of the innovation engine, if present, and ultimately the BMC code. Finally it provides a solution by which the operating system can see the measurements for all firmware components on the platform.

TPM 34 may provide security functions including protected storage, measurement and attestation of the software configuration of the platform, and cryptographic functioning. TPM 34 may permit access to data in protected storage by programs only upon authorization to make the data available. TPM 34 may perform cryptographic key generation, encryption, and decryption. In some embodiments. TPM 34 may be implemented in hardware. In further embodiments. TPM 34 may consist of a module similar to a smart card. In other embodiments, TPM 34 may be implemented in software. Such an implementation is called a virtual TPM. In such an implementation, a software mechanism may be used to assert/de-assert physical presence.

The computer and components illustrated in FIG. 1 are for explanation, not for limitation. In some other embodiments, embedded systems. PDAs, cell phones, and other TPM devices which contain a TPM may signal physical presence to the TPM in response to receiving a message over a trusted network connection. In many other embodiments, the chipset may contain alternative components or additional components as will be known to those of skill in the art. In some further embodiments, the TPM may be integrated into another device (an "integrated TPM"). For example, the TPM and BIOS may be integrated into a super I/O chip. In other further embodiments, the TPM may be integrated into an PCH chip, a network interface card, or other components of a computer. In these many other embodiments, the appropriate bus may be used to assert/de-assert physical presence. In several other embodiments, the components communicating with the chipset may differ from the components illustrated in FIG. 2.

One example of an alternative embodiment consists of a computer built according to the Intel®. Active Management Technology (Intel®AMT). Intel® AMT is a combination of hardware, firmware and software that may provide for out of band communication for management access to client systems, independent of system state. AMT-enabled computers may include an integrated TPM and a platform system management module other than a BMC. In addition, an AMT-enabled computer may use a hardware mechanism other than a General Purpose Input/Output (GPIO) line to send signals from the platform system management module to the TPM.

The BMC 24 may include its own SPI bus controller 36 in some embodiments. A BMC flash 37 may include a BMC operation image 38 and an SPI image 40.

The innovation engine can be used and still the management engine can measure the BMC directly while the image is still stored in the flash 20. Once the BMC firmware is authenticated, the BMC firmware can be fetched from the SPI bus attached to the PCH. Additionally, features that are tunneled through the SPI bus or other management traffic utilizing Management Component Transport Protocol (MCTP) may be enabled after proper identification. See MCTP Base Specification version 1.1.0, 2010-Apr.-22, available from Distributed Management Task Force, Inc.

In some embodiments novel data stores, such as phase change memory (PCMs), may be used as well as other potential use cases such as migration and management engine binary or other such firmware elements, such as pre-boot firmware context, etc. In addition, additional banks of TPM resources such as PCRs and the like can be added which could in turn be mapped to a type of firmware use case such as BIOS firmware.

Thus in some embodiments, even though there are separate domains for the BMC and the management engine, only one TPM is needed. This obviates the need for a separate TPM for the management engine and allows use of a firmware trusted platform module for all server use cases, in some embodiments.

Figure 2:
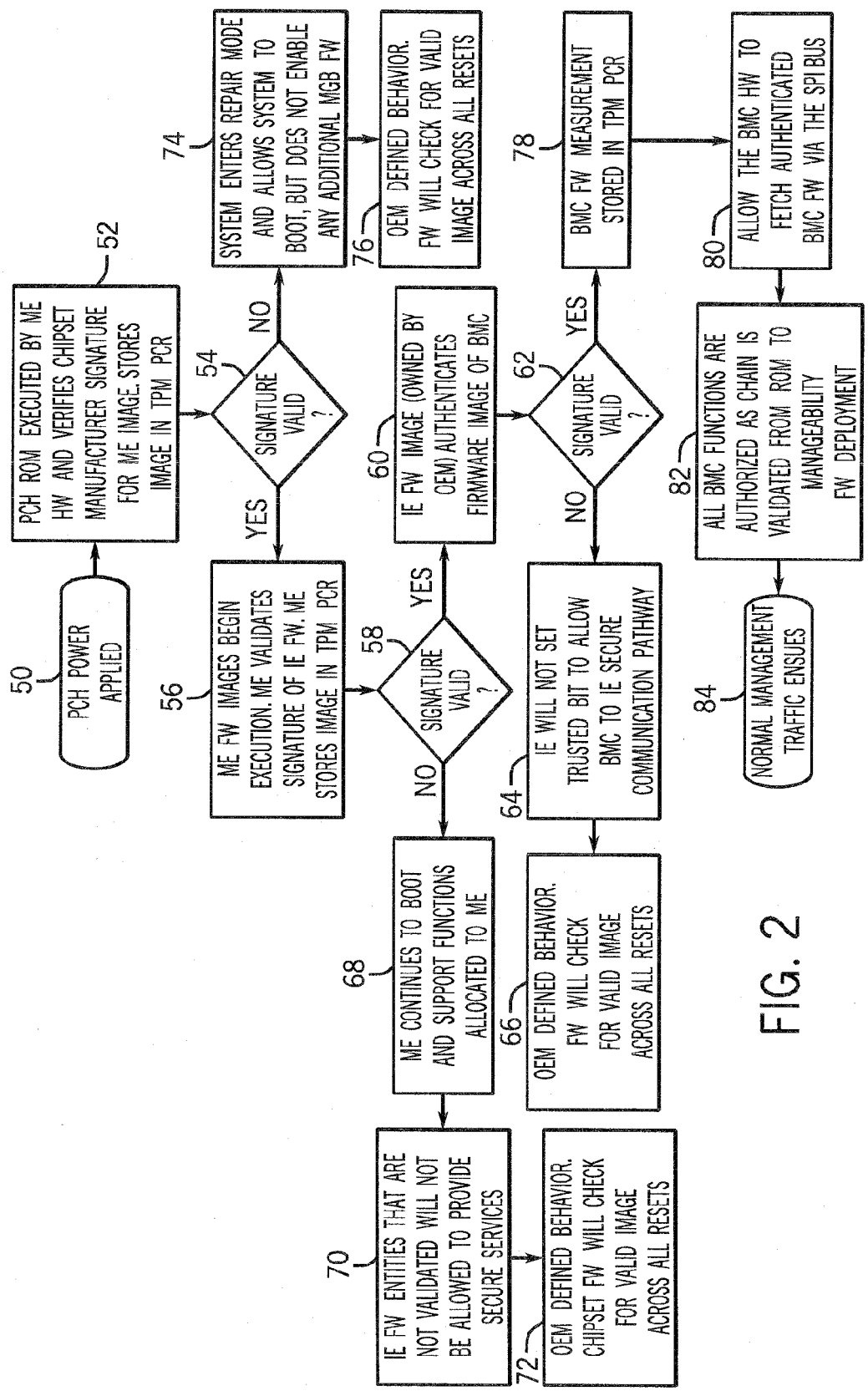
FIG. 2 is a flow chart for one embodiment of the present invention.

Referring to FIG. 2, a sequence may be implemented in software, firmware and/or hardware. In software and firmware embodiments it may be implemented by instructions executable by a computer and stored in one or more non-transitory computer readable media such as magnetic, optical or semiconductor storage. In some embodiments more than one storage may be used.

The sequence begins with power application to the PCH as indicated at block 50. The PCH ROM code 18, executed by the management engine hardware 16, verifies the signature for the management engine image 30 stored in the flash 20. Then that verified image's measurement is stored in the trusted platform module PCRs 42 as indicated in block 52. So now the management engine has been verified and so it can be used to verify other images in the flash 20.

A check at diamond 54 determines whether that signature is valid. If so, the management engine firmware image 30 begins execution (block 56). The management engine 16 validates a signature of the innovation engine firmware 32. The management engine stores the image 32's measurement in the trusted platform module's PCR as indicated in block 56. So now the innovation engine firmware has been validated as well, and can be used to validate other images.

A check at diamond 58 determines whether the innovation engine signature is valid. If so, the innovation engine firmware image 32. (normally owned by the original equipment manufacturer) authenticates a firmware image 28 of the BMC as indicated in block 60. So now the BMC image has been validated as well.

A check at diamond 62 determines whether the BMC signature is valid. If so, the BMC firmware measurement is stored in the TPM PCR as indicated in block 78. Then the BMC hardware is allowed to fetch authenticated BMC firmware via the SPI bus as indicated in block 80. Next all BMC functions are authorized as a chain is validated from ROM 18 to management engine firmware 30 deployment as indicated in block 82. Then normal management traffic ensues as indicated in block 84.

If the signature check at diamond 54 indicates that the signature is not valid, the system enters repair mode and allows system to boot but does not enable any additional manageability firmware as indicated in block 74. Then original equipment manufacturer defined behavior may be initiated. Firmware from the chipset manufacturer checks for valid images across all resets as indicated in block 76.

If the signature is not valid at diamond 58, the management engine continues to boot and support functions allocated to the management engine at block 68. The innovation engine firmware entities that are not validated would not be allowed to provide secure services as indicated in block 70. Original equipment manufacturer defined behavior then proceeds as indicated in block 72. Chipset firmware checks for valid images across all resets as indicated in block 72.

The following clauses and/or examples pertain to further embodiments:

One example embodiment may be a method for providing a platform including: a chipset together with a baseboard management controller and using a single trusted platform module for said platform. The method may also include coupling said chipset and said baseboard management controller using an enhanced serial parallel interface bus. The method may include directly connecting a serial parallel interface memory to said chipset to store code for said baseboard management controller. The method may include providing a trusted platform module for said chipset. The method may include providing a physical trusted platform module directly connected to said chipset. The method may include providing a firmware trusted platform module within said chipset. The method may include providing embedded read only memory in said chipset storing code to verify a signature of a management engine. The method may include using the management engine to verify a signature of an innovation engine. The method may include using said innovation engine to authenticate a firmware image, stored in a flash directly connected to the chipset, of a baseboard management controller. The method may also include enabling the baseboard management controller to fetch the authenticated firmware via an enhanced serial parallel interface bus.

Another example embodiment may be a computer readable media storing instructions to enable a platform including a chipset together with a baseboard management controller to use a single trusted platform module for said platform. The media may store instructions to couple said chipset and said baseboard management controller using an enhanced serial parallel interface bus. The media may store instructions to directly connect a serial parallel interface memory to said chipset to store code for said baseboard management controller. The media may store storing instructions to directly connect a physical trusted platform module to said chipset. The media may store instructions to provide a firmware trusted platform module within said chipset. The media may store instructions to provide embedded read only memory in said chipset storing code to verify a signature of a management engine. The media may store instructions to use a management engine to verify a signature of an innovation engine. The media may store instructions to use said innovation engine to authenticate a firmware image, stored in a flash directly connected to said chipset, of a baseboard management controller. The media may store instructions to use a baseboard management controller to fetch authenticated firmware via an enhanced serial parallel interface bus.

Another example embodiment may be an apparatus comprising a chipset, a baseboard management controller coupled to said chipset, and a single trusted platform module for said chipset and said baseboard management controller. The apparatus may include a central processing unit coupled to said chipset. The apparatus may include said trusted platform module is coupled to said chipset. The apparatus may include a serial parallel interface flash coupled to said chipset. The apparatus may also include said serial parallel interface to store a basic input output apparatus, an image for a baseboard management controller, an image for a management engine and an image for an innovation engine. The apparatus may include an embedded read only memory in said chipset to verify the signature of a management engine image. The apparatus may include said chipset coupled to said baseboard management controller via an enhanced serial parallel interface bus. The apparatus may also include a serial parallel interface memory connected to said chipset to store code for said baseboard management controller. The apparatus may include a management engine to verify a signature of an innovation engine. The apparatus may include said innovation engine to authenticate a firmware image, stored in a flash directly connected to the chipset. The apparatus may also include said baseboard management controller to fetch authenticated firmware via an enhanced serial parallel interface bus.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A machine-implemented method comprising:
    in a platform including a chipset together with a baseboard management controller and a flash memory directly connected to the chipset to store a firmware image, creating a manageability engine to provide isolated computer hardware operating below an operating system;
    storing code for an innovation engine that enables the integration of the baseboard management controller into the chipset, code for a baseboard management controller and a basic input/output system in said flash memory; and
    using a single trusted platform module for said chipset, said controller, said basic input/output system and said innovation engine.

2. The method of claim 1 including coupling said chipset and said baseboard management controller using an enhanced serial parallel interface bus.

3. The method of claim 1 including directly connecting a serial parallel interface memory to said chipset to store code for said baseboard management controller.

4. The method of claim 1 including providing a physical trusted platform module directly connected to said chipset.

5. The method of claim 1 including providing a firmware trusted platform module within said chipset.

6. The method of claim 1 including storing code to verify a signature of a management engine in an embedded read only memory in said chipset.

7. The method of claim 1 including using the management engine to verify a signature of an innovation engine.

8. The method of claim 1 including enabling the baseboard management controller to fetch the authenticated firmware via an enhanced serial parallel interface bus.

9. One or more non-transitory computer readable media storing instructions to:
    storing code for an innovation engine, code for a baseboard management controller and a basic input/output system in a flash memory in a platform including a chipset together with the baseboard management controller and the flash memory directly connected to the chipset to store a firmware images and a manageability engine; and
    enabling use of a single trusted platform module for said chipset, said controller, said basic input/output system and said innovation engine.

10. The medium of claim 9 further storing instructions to couple said chipset and said baseboard management controller using an enhanced serial parallel interface bus.

11. The medium of claim 9 further storing instructions to directly connect a serial parallel interface memory to said chipset to store code for said baseboard management controller.

12. The medium of claim 9 further storing instructions to directly connect a physical trusted platform module to said chipset.

13. The medium of claim 9 further storing instructions to provide a firmware trusted platform module within said chipset.

14. The medium of claim 9 further storing instructions to provide embedded read only memory in said chipset storing code to verify a signature of a management engine.

15. The medium of claim 9 further storing instructions to use a management engine to verify a signature of an innovation engine.

16. The medium of claim 9 further storing instructions to use a baseboard management controller to fetch authenticated firmware via an enhanced serial parallel interface bus.

17. An apparatus comprising:
a chipset;
a flash memory directly connected to said chipset to store a firmware image, code for an innovation engine and a basic input/output system;
a baseboard management controller coupled to said chipset; and
a single trusted platform module for said chipset, said baseboard management controller, said innovation engine and said basic input/output system.

18. The apparatus of claim 17 including a central processing unit coupled to said chipset.

19. The apparatus of a system of claim 17 further including a serial parallel interface flash coupled to said chipset.

20. The apparatus of claim 19, said serial parallel interface to store a basic input output system, an image for a baseboard management controller, an image for a management engine and an image for an innovation engine.

21. The apparatus of claim 17 including an embedded read only memory in said chipset to verify the signature of a management engine image.

22. The apparatus of claim 17 said chipset coupled to said baseboard management controller via an enhanced serial parallel interface bus.

23. The apparatus of claim 17, including a serial parallel interface memory connected to said chipset to store code for said baseboard management controller.

24. The apparatus of claim 17, including a management engine to verify a signature of an innovation engine.

25. The apparatus of claim 17, said baseboard management controller to fetch authenticated firmware via an enhanced serial parallel interface bus.

* * * * *